Sept. 24, 1957
W. J. OWEN
2,807,153
VEHICLE REFRIGERATING APPARATUS
Filed Aug. 31, 1953
2 Sheets-Sheet 1
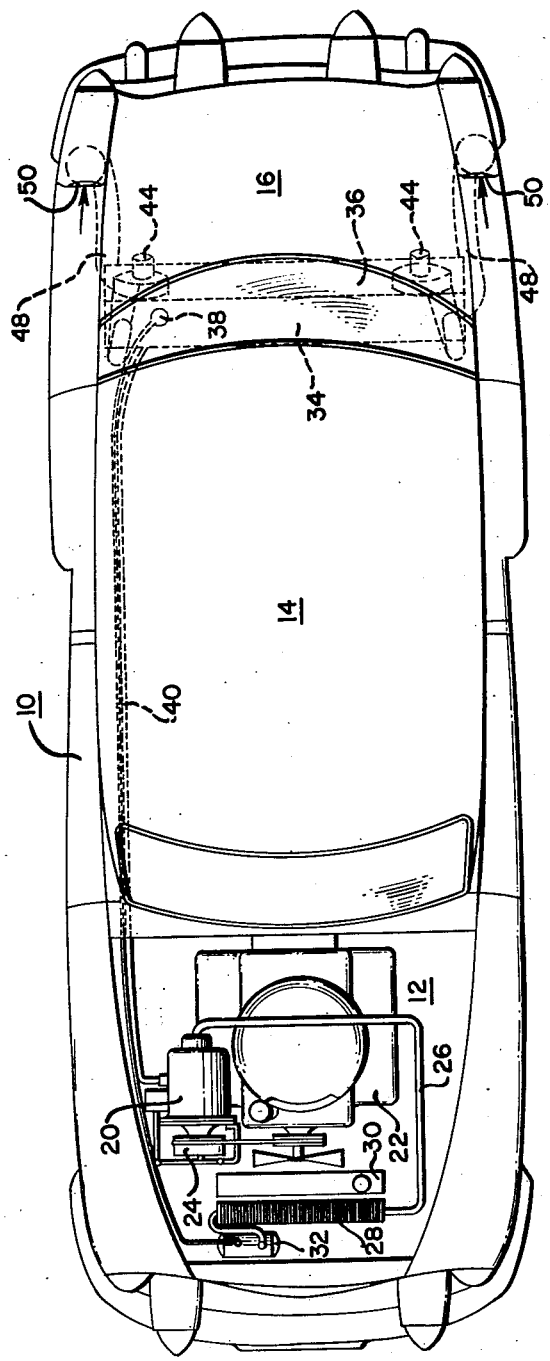
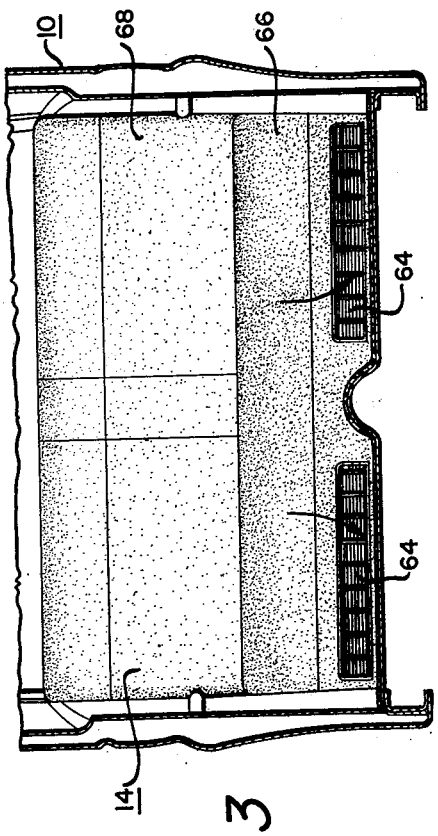
INVENTOR.
Webster J. Owen
BY R. R. Candor
His Attorney Sept. 24, 1957    W. J. OWEN    2,807,153
VEHICLE REFRIGERATING APPARATUS
Filed Aug. 31, 1953    2 Sheets-Sheet 2
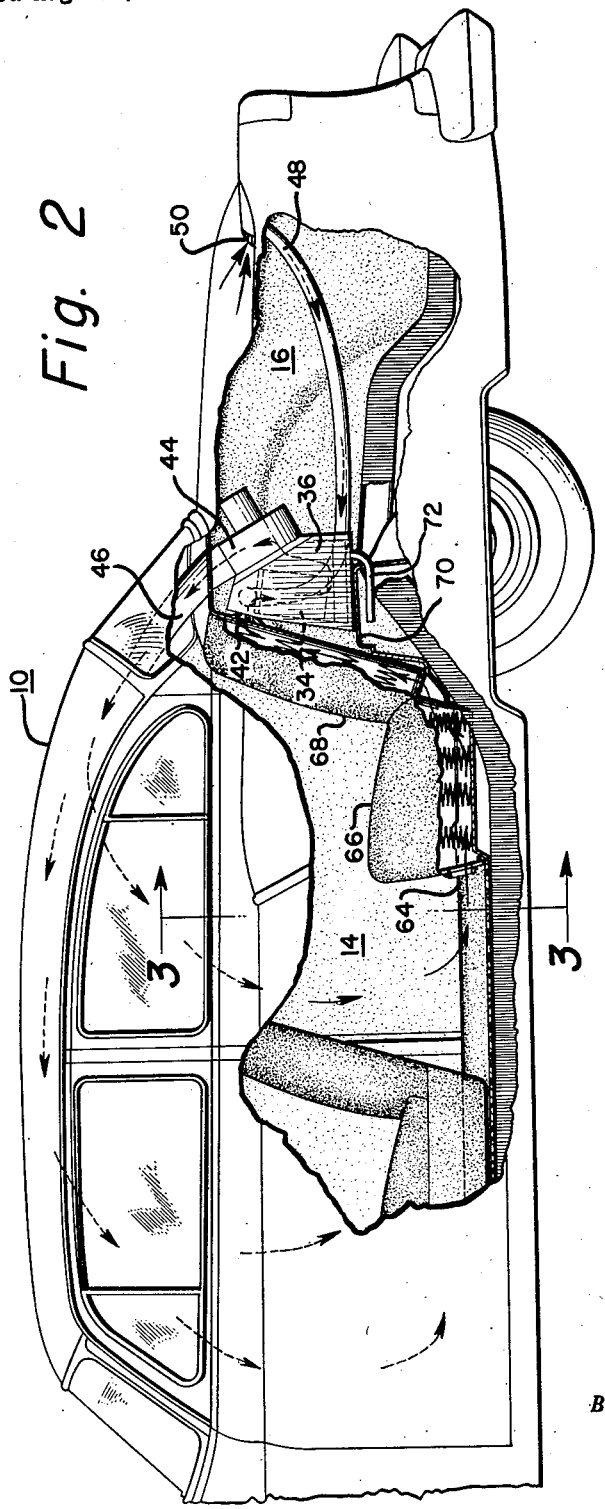
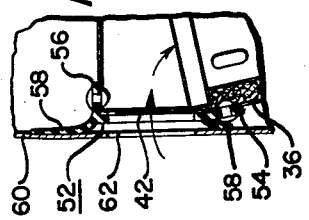
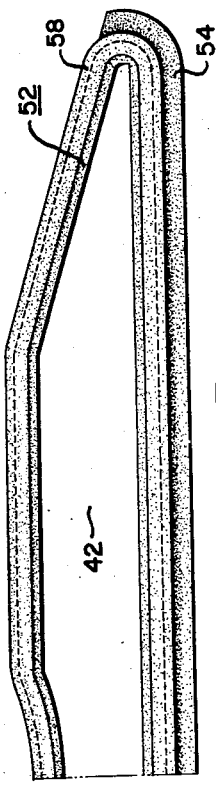
INVENTOR.
Webster J. Owen
BY R. R. Candor
His Attorney United States Patent Office 2,807,153
Patented Sept. 24, 1957

2,807,153

VEHICLE REFRIGERATING APPARATUS

Webster J. Owen, Birmingham, Mich., assignor to General Motors Corporation, Detroit, Mich., a corporation of Delaware Application August 31, 1953, Serial No. 377,435

1 Claim. (Cl. 62—117.1)

This invention relates to refrigreating apparatus and more particularly to an automobile air conditioning system.

It is an object of this invention to provide an improved arrangement for circulating air to be conditioned through a cooling unit mounted in the trunk compartment of a passenger automobile.

It has long been recognized that it is both highly desirable and possible to air condition passenger automobiles but the cost and size of the equipment heretofore available has been too great for widespread acceptance of automobile air conditioning. It is an object of this invention to reduce both the size and cost of the equipment required for air conditioning a passenger automobile.

It is recognized that others have previously mounted cooling units in the trunk compartment of the car and that the re-circulated air has been returned to the cooling unit beneath the rear seat. Peo Patent 2,180,943, for example, shows such an arrangement but in these prior arrangements expensive and space-consuming return air ducts are required.

It is an object of this invention to improve upon and simplify such prior systems by eliminating the need for special return air ducts and otherwise improving the air flow arrangement.

Further objects and advantages of the present invention will be apparent from the following description, reference being had to the accompanying drawings wherein a preferred embodiment of the present invention is clearly shown.

In the drawings:

Figure 1 is a plan view partially diagrammatic showing an automobile equipped with an air conditioning system constructed in accordance with this invention;

Figure 2 is a fragmentary elevational view with parts broken away showing the arrangement of the cooling unit and air flow ducts relative to the trunk compartment and the passenger compartment of the car;

Figure 3 is a fragmentary sectional view taken substantially on line 3—3 of Figure 2;

Figure 4 is a fragmentary sectional view showing the construction and arrangement of the gasket which is provided between the cooling unit and the back wall of the passenger compartment; and Figure 5 is a fragmentary elevational view showing the front side of the gasket shown in Figure 4.

Referring now to the drawing wherein a preferred embodiment of the invention has been shown, reference numeral 10 designates a conventional passenger automobile having an engine compartment 12, passenger compartment 14 and a luggage compartment 16. The air conditioning system used in cooling the passenger compartment of the car includes a refrigerant compressor 20 which is adapted to be driven by the main car engine 22 through a clutch 24 which may be either manually or automatically controlled so as to connect and disconnect the refrigerant compressor to the car engine in accordance with refrigeration requirements. Since the construction and operation of the clutch forms no part of this invention, the same will not be described in detail.

The compressed refrigerant flows from the compressor 20 through a line 26 into a condenser 28 located in front of the car engine radiator 30 in accordance with standard practice. The liquefied refrigerant flows from the condenser 28 into a receiver 32 from whence the liquid refrigerant is supplied to an evaporator 34 located within evaporator housing 36 in the trunk compartment of the car. The flow of refrigerant to the evaporator is controlled by means of conventional thermostatic expansion valve 38. The vaporized refrigerant flows from the evaporator to the compressor through the suction line 40. Any conventional refrigerant circuit and refrigerant controls could be used without departing from the spirit of this invention.

The evaporator housing 36 is provided with an air inlet 42 adjacent the upper front edge thereof through which which re-circulated air to be conditioned enters the upper part of the evaporator housing. Fresh air may also be introduced to the top portion of the evaporator housing 36 through fresh air ducts 48. The inlets 50 to the fresh air ducts 48 are provided adjacent the upper rear portion of the fenders as shown. A pair of blowers 44 serve to draw the air in through the inlets 42 and 50 and to pull the air down over the evaporator 34 and then to discharge the cooled air out through air distributing ducts 46.

By virtue of the construction and arrangement shown, the need for special return air ducts has been eliminated as the return air inlet 42 of the evaporator housing is arranged directly adjacent an aperture 62 in wall 60 which separates the passenger compartment from the luggage compartment. A gasket generally designated by the reference numeral 52 is secured to the upper front edge of the evaporator housing 36 and includes a first flange portion 54 which is riveted or otherwise secured to the front side of the housing 36 and a second flange portion 56 which is riveted or otherwise secured to the top wall of the housing 36. A flexible lip portion 58 projects forwardly from the evaporator housing so as to contact the rear side of the wall 60. In Figure 4 the flexible lip portion 58 has been shown flattened out against the wall 60 whereas in Figure 5 this lip has been shown in its original shape in which the lip projects substantially directly in front of the flanges 54 and 56.

A pair of return air inlet grills 64 are provided in the front edge of the rear seat cushion as best shown in Figures 2 and 3 and these serve to admit air from the passenger compartment into the hollow portion of the rear seat cushion 66 and the back cushion 68. The cushions 66 and 68 are of the conventional type which include coil springs having interstices through which the air returning to the evaporator housing 36 is free to flow with the result that it is not necessary to use any special return air ducts. Reference numeral 70 designates the raised floor portion of the trunk compartment on which the evaporator 36 is mounted.

By virtue of mounting the evaporator housing directly adjacent the wall which separates the passenger compartment from the luggage compartment and admitting the return air to the evaporator compartment through an opening adjacent the top of the evaporator housing, the most advantageous direction of air flow through the evaporator housing is made possible. The condensate which forms on the evaporator freely drains into the bottom of the housing 36 and into the drain pipe 72. It is obvious, therefore, that the air conditioning equipment shown does not require expensive return air ducts and occupies a minimum amount of valuable space without any penalty in operating efficiency. Furthermore, it is not necessary to materially alter the standard car construction to install the equipment.

While the embodiment of the present invention as herein disclosed, constitutes a preferred form, it is to be understood that other forms might be adopted.

What is claimed is as follows:

In combination with an automobile having a passenger compartment and a luggage compartment separated from one another by means of a wall, a refrigerating system including an evaporator disposed within said luggage compartment, a housing for said evaporator having a return air inlet adjacent the upper end thereof above said evaporator, said passenger compartment having seat means therein including bottom and back portions, said seat means having interstices in the bottom and back portions through which air from the bottom portion of said passenger compartment flows rearwardly and upwardly to said inlet, said back portion of said seat having an air opening arranged in alignment with said return air inlet, a gasket means secured to said evaporator housing and surrounding said air inlet, said gasket means including a flexible flange portion for engaging said back seat portion so as to direct the air from the interstices in said back seat portion into said return air inlet and blower means for pulling air in through said inlet, downwardly over said evaporator, and for discharging the conditioned air into said passenger compartment, the lower portion of said housing forming a condensate collecting means beneath said evaporator and in the path of the air leaving said evaporator.

References Cited in the file of this patent

UNITED STATES PATENTS

| | | |
|---|---|---|
| 2,180,760 | Mayo | Nov. 21, 1939 |
| 2,311,622 | Alexander et al. | Feb. 23, 1943 |
| 2,336,089 | Gould | Dec. 7, 1943 |
| 2,479,170 | Kuempel | Aug. 16, 1949 |
| 2,569,009 | Kuempel | Sept. 25, 1951 |
| 2,618,133 | Kennedy | Nov. 18, 1952 |